United States Patent [19]

Lott

[11] Patent Number: 4,797,063
[45] Date of Patent: Jan. 10, 1989

[54] FLOATING SUCTION APPARATUS
[75] Inventor: Gerald Lott, Houston, Tex.
[73] Assignee: Chem-O Company, Inc., Houston, Tex.
[21] Appl. No.: 54,742
[22] Filed: May 27, 1987
[51] Int. Cl.$^4$ ............................................. F04D 31/00
[52] U.S. Cl. ................... 415/116; 210/242.2; 261/120
[58] Field of Search ................ 415/116; 261/120, 122, 261/124; 210/242.2, 242.4

[56] References Cited

U.S. PATENT DOCUMENTS

| 3,218,042 | 11/1965 | Ciabattari et al. | 261/120 |
| 3,756,578 | 9/1973 | McGurk | 261/120 |
| 3,794,303 | 2/1974 | Hirshon | 261/120 |
| 3,799,511 | 3/1974 | Svantesson | 261/120 |
| 3,852,384 | 12/1974 | Bearden | 210/242.2 |
| 4,287,060 | 9/1981 | Coggins | 261/120 |
| 4,365,978 | 12/1982 | Scott | 261/122 |

FOREIGN PATENT DOCUMENTS

| 2447337 | 9/1974 | Fed. Rep. of Germany | 261/120 |
| 1248837 | 11/1960 | France | 261/120 |
| 775734 | 5/1957 | United Kingdom | 261/120 |

Primary Examiner—Robert E. Garrett
Assistant Examiner—John T. Kwon
Attorney, Agent, or Firm—Pravel, Gambrell, Hewitt, Kimball & Krieger

[57] ABSTRACT

The invention relates to a floating suction device for a pump wherein the pickup point for the pump suction can be adjusted to various elevations. An aeration feature may be combined with the floating suction device to sparge compressed gas into an oil/hydrocarbon layer to promote movement of hydrocarbons from that layer into a topmost hydrocarbon rich layer for ultimate pumping through the floating suction device.

18 Claims, 2 Drawing Sheets

FLOATING SUCTION APPARATUS

FIELD OF THE INVENTION

The field of this invention relates to floating pump suction lines which allow for withdrawal of fluid from a preselected elevation. These devices are especially useful in applications involving layers of fluids having different densities.

BACKGROUND OF THE INVENTION

In the past, hydrocarbon processing industries have employed collection ponds, pits or tanks for various in-process fluids or waste streams. Many of these storage facilities for such fluids included fluids of varying densities where discreet layers were formed between various fluids. In some applications, a hydrocarbon layer would be found present above an aqueous layer. In other applications, the aqueous layer would contain hydrocarbons.

In the past, when it has been desired to remove the hydrocarbon rich layer floating on the top of a storage container floating suction lines have been used. The floating suction line usually comprised of a hose with a plurality of floatation devices tied directly to the hose. The open end of the hose would thus be suspended adjacent the top liquid level of the hydrocarbon layer. These floating suction lines could not be adapted to withdraw fluids at points other than the top most liquid level in the hydrocarbon layer.

It is an object of this invention to provide a floating suction line mechanism wherein fluids may be extracted at preselected and predetermined depths below the top most liquid surface.

It is a further object of this invention to combine the adjustable inlet feature with an aeration feature. The aeration feature would be useful for blowing compressed gas in an oil-water layer below a top most oil layer to assist hydrocarbon materials to float upwardly from the oil/water layer into the oil layer for ultimate withdrawal into a pump suction line.

SUMMARY OF THE INVENTION

The invention relates to a floating suction device for a pump wherein the pickup point for the pump suction can be adjusted to various elevations. An aeration feature may be combined with the floating suction device to sparge compressed gas into an oil/hydrocarbon layer to promote movement of hydrocarbons from that layer into a topmost hydrocarbon rich layer for ultimate pumping through the floating suction device.

DETAILED DESCRIPTION OF THE PREFERRED EMBODIMENT

Figure 1:
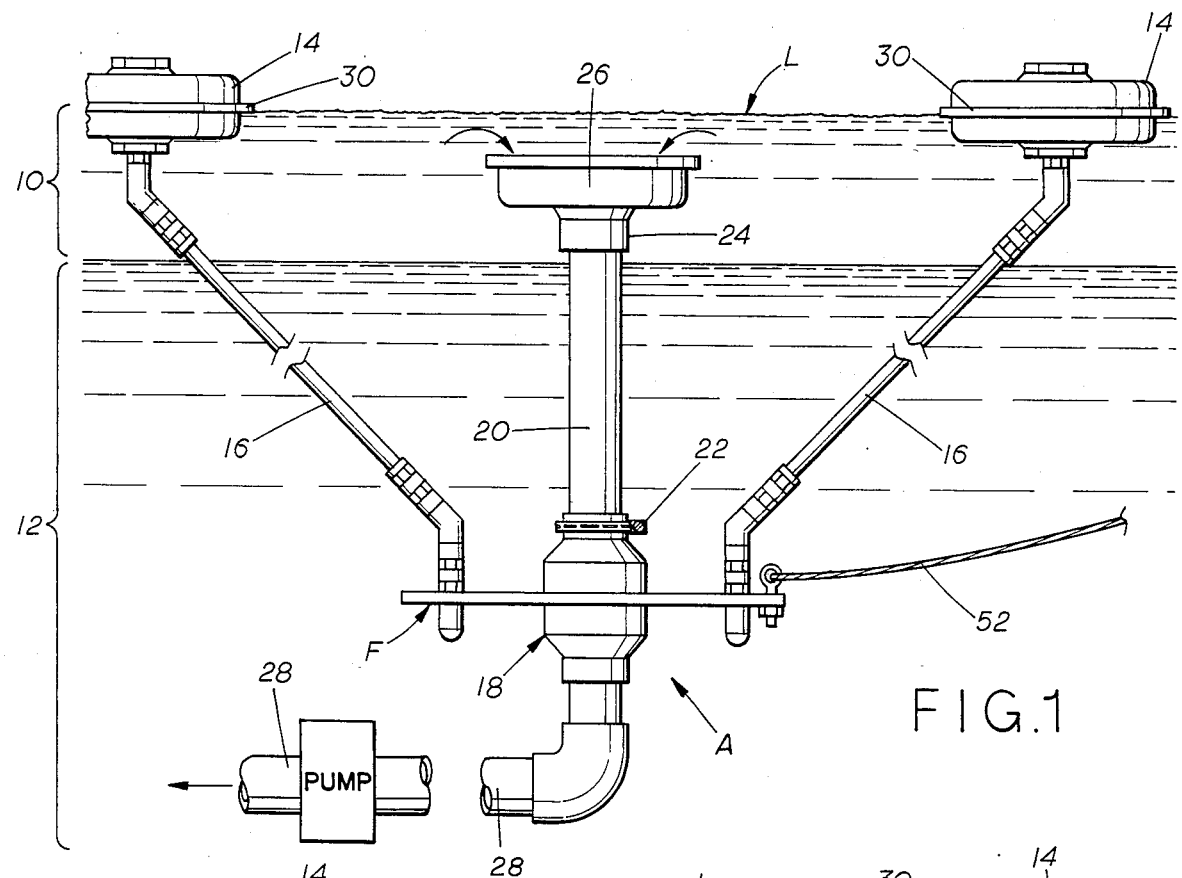
FIG. 1 is an elevational view of the apparatus of the present invention showing the adjustable floating suction line.

The apparatus A of the present invention is illustrated in FIG. 1. Frame F is suspended below the level of liquid L. Liquid L is formed of two layers 10 and 12. Layer 10 has a lighter density than layer 12 and is predominantly a hydrocarbon material. Layer 12 is disposed below layer 10 and is predominantly an aqueous layer. In certain applications, layer 12 can contain as much as fifty percent hydrocarbons.

Frame F is preferably constructed of a lightweight material such as polyvinylchloride and is preferably in a disc shape. A plurality of floats 14 are assembled to frame F. Floats 14 are connected to frame F via mounting members 16. It is preferred to provide additional stability to frame F to have mounting members 16 angularly disposed (FIGS. 1-2) with respect to frame F so as to position floats 14 beyond the periphery of frame F. Frame F includes a mounting fitting 18 connected therethrough. 10 An intake standpipe 20 is adapted to extend through mounting fitting 18 and be connected thereto via clamp 22.

Intake Standpipe 20 has a first connection 24 onto which, a strainer 26 can be optionally attached. At the opposite end of standpipe 20, a second connection 28 is provided for purposes of hooking up a suction line to a pump (not shown).

Figure 2:
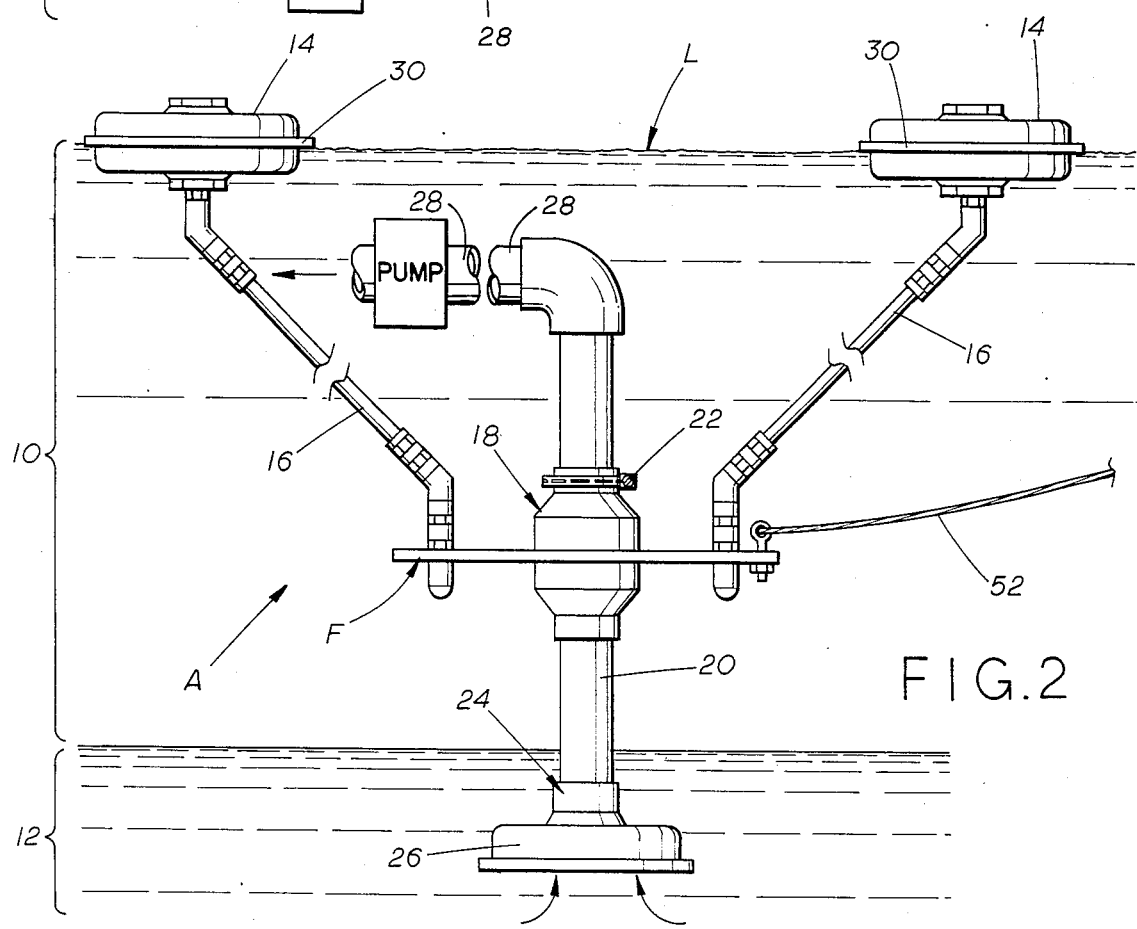
FIG. 2 is an elevational view of the apparatus with the suction line arranged in an alternative position.
Figure 3:
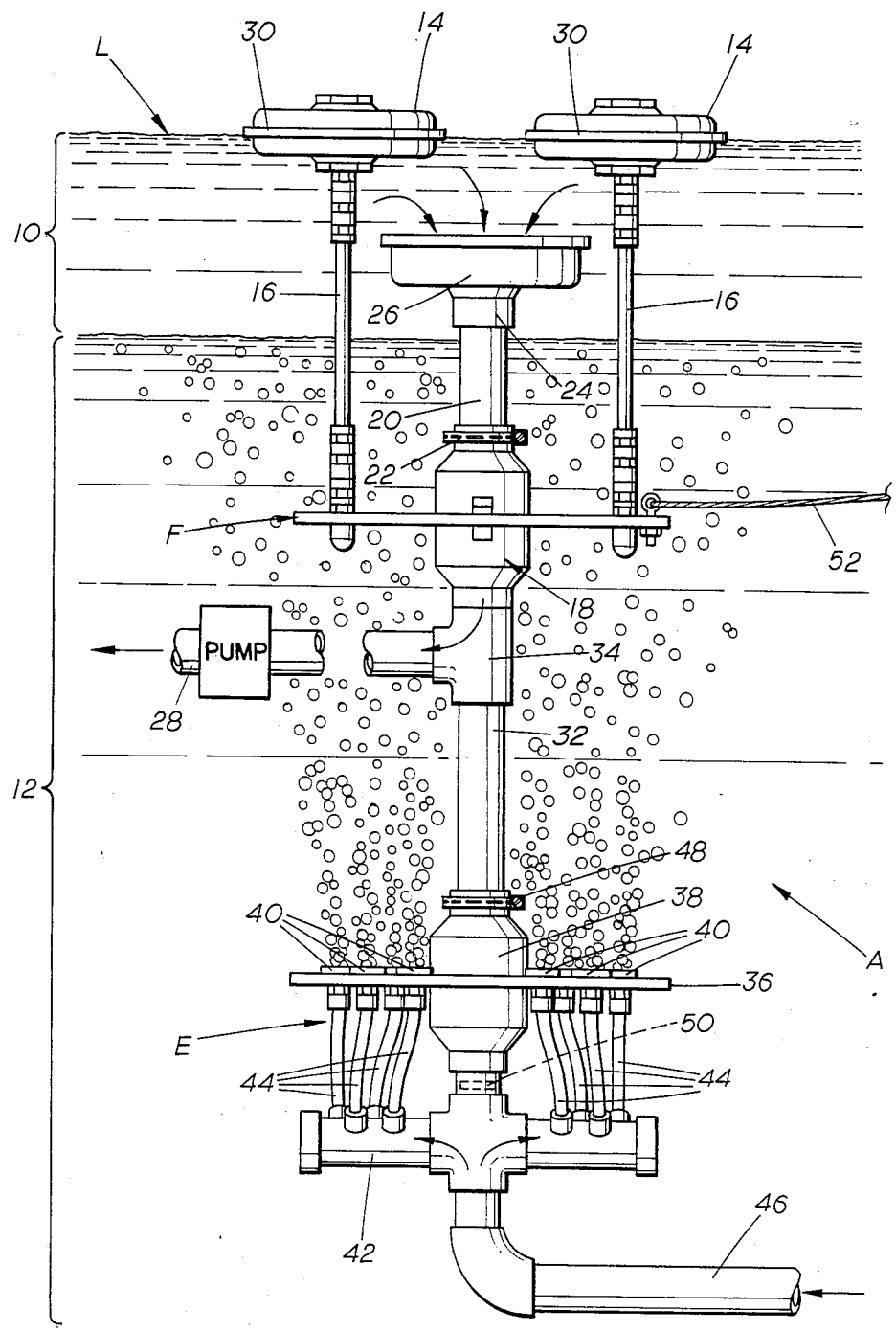
FIG. 3 is an elevational view of the apparatus as shown in FIG. 1 but with the aeration feature added.

When used without an aeration device E (FIG. 3), standpipe 20 merely contains a 90° elbow at its lower end as opposed o the T shown in FIG. 3. Thus, when used without the aeration device E, the apparatus A can be assembled in a manner shown in FIG. 1 where strainer 26 and thus the intake point is disposed above frame F adjacent to floats 14. Alternatively, strainer 26 may be removed and standpipe 20 inserted into mounting fitting 18 in a direction from above to below frame F. In installing standpipe 20 in the manner described in the previous sentence, the strainer 26 is then reconnected to the standpipe 20 and can be disposed below frame F (FIG. 2) such that the intake is below frame F. Thus the rangeability of the actual pickup location for the apparatus A is increased by the possibilities of mounting standpipe 20 to frame F with first connection 24 disposed either above frame F and adjacent floats 14 (Fib. 1) or below frame F (FIG. 2). Furthermore, by slackening clamp 22 standpipe 20 can be moved with respect to frame F to further adjust the position of first connection 24.

The depth of support of frame F can also be varied by virtue of using mounting members 16 which have telescoping elements therein. As shown in FIGS. 1 and 2, mounting members 16 can be of a nested tube telescoping design to allow for extension or reduction of their overall length as desired. Another feature on the floats 14 are bumpers 30 which are mounted to the periphery of each float. Bumpers 30 are annular rings of a resilient material compatible with the liquid L found in layers 10 or 12. The bumpers 30 are placed on each float 14 for use in enclosures where there may be significant movement of the apparatus A. Therefore to avoid damage to floats 14, bumpers 30 are installed to absorb shocks upon contact with the vessel or other enclosure wall (not shown).

Optionally, in situations where layer 12 has entrained hydrocarbons, it may be desirable to add the aeration device E to standpipe 20. Alternately aeration device E can be used in isolation. The aeration device allows bubbling of compressed gas in layer 12 which clings to the immiscible hydrocarbon particles. Aeration device E also acts as a clarifier due to the attraction between the vapor bubbles and colloidal suspensions. The bubbles then rise through layer 12 with the hydrocarbons clinging thereto until the bubbles enter layer 10. The apparatus A then removes the hydrocarbons from layer 10 via first connection 24 (FIG. 1). In order to employ the aeration device E, an extension segment 32 is connected to standpipe 20. A clamp 48 secures extension segment 32 to mounting member 38. This is shown in FIG. 3 with extension segment 32 connected to a T section 34.

Aeration device E comprises a sparge plate 36 connected to a mounting member 38. A plurality of nozzles 40 are mounted through sparge plate 36. A manifold 42 is connected to each nozzle 40 by a series of hoses 44.

The manifold 42 has an inlet connection 46. Inlet connection 46 is hooked up to a source of compressed gas (not shown). In applications where extension segment 32 is a pipe in fluid communication with second connection 28, a plug 50 is employed for isolation of connection 28 from connection 46. The length of segment 32 can be varied depending on the application.

Rope 52 can be connected to frame F to facilitate retrieval of the apparatus.

The foregoing disclosure and description of the invention are illustrative and explanatory thereof, and various changes in the size, shape and materials, as well as in the details of the illustrated construction may be made without departing from the spirit of the invention.

I claim:

1. An apparatus for floating within immisible layers of fluid above a bottom surface in order to withdraw fluid from a preselected layer comprising:
   a frame;
   flotation means connected to said frame for securing said frame at a preselected elevation within the fluid;
   pump means mounted with said frame for drawing fluid in the apparatus said pump means including pump intake means; and
   positioning means for mounting said pump intake means at various vertical positions above and below said frame, said apparatus being independent of contact with the bottom surface.

2. The apparatus of claim 1 further comprising:
   aeration means mounted with said pump means for driving fluid toward said pump intake means.

3. The apparatus of claim 2 wherein said pump means comprises:
   a standpipe mounted to said frame, said standpipe having a first connection thereon adapted to be connected to the suction line;
   said standpipe having a second connection thereon to allow fluid to pass into said standpipe for withdrawal into the pump through the suction line;
   means for adjusting the position of said second connection relative to the position of said frame.

4. The apparatus of claim 3 further comprising:
   a strainer mounted to said second connection.

5. The apparatus of claim 3 wherein:
   said frame comprises a mounting fitting thereon;
   said stand pipe adapted to pass through said mounting fitting and be selectively secured thereto for adjustment of the position of said second connection on said standpipe.

6. The apparatus of claim 5 wherein:
   said flotation means comprises a plurality of floats;
   each float secured to said frame by a mounting member.

7. The apparatus of claim 6 wherein:
   said mounting members have an adjustable length;
   said mounting members are angularly disposed with respect to said frame such that said floats extend radially outwardly beyond the periphery of said frame.

8. The apparatus of claim 3 wherein:
   said standpipe can be secured to said frame in a first position wherein said first connection extends above said frame and adjacent said floats and a second position wherein said first connection extends on the opposite side of said frame from said first position.

9. The apparatus of claim 2 wherein said aeration means further comprises:
   at least one spray nozzle mounted to the opposite side of said frame from said flotation means.

10. The apparatus of claim 2 wherein:
    said standpipe comprises an extension segment extending from said first connection;
    said aeration means further comprises:
    a nozzle plate mounted to said extension segment;
    a plurality of nozzles mounted to said plate;
    a manifold in flow communication with all of said nozzles; and
    a connection on said manifold adapted for hookup to an external source of compressed fluid.

11. The apparatus of claim 8 wherein said aeration means further comprises:

12. The apparatus of claim 2 wherein:
    said standpipe comprises an extension segment extending from said first connection;
    said aeration means further comprises:
    a nozzle plate mounted to said extension segment;
    a plurality of nozzles mounted to said plate;
    a manifold in flow communication with all of said nozzles; and
    a connection on said manifold adapted for hookup to an external source of compressed fluid.

13. The apparatus of claim 1 further comprising:
    peripheral bumpers mounted to said flotation means.

14. The apparatus of claim 12 further comprising:
    peripheral bumpers mounted to said floats.

15. A fluid aeration apparatus adapted for use with a body of fluid having a bottom surface, comprising:
    a frame;
    flotation means with said frame for securing said frame at preselected elevations within the fluid;
    aeration means mounted to said frame for aerating said fluid,
    positioning means with said aeration means to position said aeration means within the fluid with respect to said frame, said apparatus being independent of contact with the bottom surface.

16. The apparatus of claim 15 wherein said aeration means further comprises:
    at least one spray nozzle mounted to the opposite side of said frame from said flotation means.

17. The apparatus of claim 16 wherein: said aeration means further comprises:
    a nozzle plate mounted to said extension segment;
    a plurality of nozzles mounted to said plate;
    a manifold in flow communication with all of said nozzles; and
    a connection on said manifold adapted for hookup to an external source of compressed fluid.

18. An apparatus for floating within immisible layers of fluid above a bottom surface in order to withdraw fluid from a preselected layer comprising:
    a frame;

flotation means connected to said frame for securing said frame at a preselected elevation within the fluid;

standpipe means mounted with said frame for drawing fluid into the apparatus said standpipe means including pump intake means; and aeration means mounted with said standpipe means for driving fluid toward said pump intake means; and means for mounting said pump intake means at various vertical positions above and below said frame, said apparatus being independent of contact with the bottom surface.

* * * * *

UNITED STATES PATENT AND TRADEMARK OFFICE
CERTIFICATE OF CORRECTION

PATENT NO. : 4,797,063
DATED : January 10, 1989
INVENTOR(S) : Gerald Lott

It is certified that error appears in the above-identified patent and that said Letters Patent is hereby corrected as shown below:

In column 2, line 13, please delete "10".

In column 2, line 23, please delete "o" and insert --to--.

In column 4, line 26, please insert the paragraph --at least one spray nozzle mounted to the opposite side of said frame from said flotation means.--

In column 4, line 27, please delete "2" and insert --8--.

In column 4, line 40, please delete "to" and insert --on--.

Signed and Sealed this

Thirtieth Day of May, 1989

Attest:

DONALD J. QUIGG

*Attesting Officer*     *Commissioner of Patents and Trademarks*